UNITED STATES PATENT OFFICE.

GEORGE A. DRUMMOND, OF MONTREAL, QUEBEC, CANADA.

ART OR PROCESS OF REFINING SUGAR.

SPECIFICATION forming part of Letters Patent No. 257,673, dated May 9, 1882.

Application filed February 4, 1882. (No specimens.)

*To all whom it may concern:*

Be it known that I, GEORGE ALEXANDER DRUMMOND, of the city of Montreal, in the district of Montreal and Province of Quebec, Canada, have invented certain new and useful Improvements in the Art or Process of Refining Sugar; and I do hereby declare that the following is a full, clear, and exact description of the same.

My invention has special reference to the process of clarification, which is now performed by allowing the sirup to gravitate through vessels containing animal-charcoal in a granular condition, or its equivalent. It has long been known that this process could be more effectually performed by forcing the sirup up through the purifying material; but the difficulty which has hitherto prevented this plan from being adopted is that the water or other liquid, which must follow the sirup to expel it from the vessel and cleanse the charcoal, is of less specific gravity than the sirup itself, and therefore, when forced up into the vessel, is driven through the sirup, instead of following it and clearing it out of the clarifying medium.

To obviate this difficulty and allow the sirup to be purified by forcing it from below up through the medium, and at the same time to insure the thorough cleansing of such purifying medium by water following the sirup, is the object of my invention, which may be thus described:

The charcoal or its equivalent is placed in a vessel constructed as desired, with suitable inlets and outlets, stop-cocks, gages, &c., and hung on trunnions, or otherwise so arranged as to be easily reversed. Into the lower part of this vessel is forced, by any well-known means, the sirup or solution of sugar, which passes up, overflows, and is carried off as long as may be desired. When a sufficient quantity of sirup has been forced up through the charcoal the supply from below is cut off and the vessel inverted. The remainder of the sirup—*i. e.*, that left in the charcoal—then gravitates through it, but in the original direction of its course and to the original outlet, thereby avoiding passing a second time through the clarifying substance. The water is at the same time, and during this part of the operation, let in at the original inlet, now at the top, and filtrates downward through the charcoal, resting on and following the sirup and thoroughly cleansing the charcoal from it, till the operation is completed and the charcoal ready to be removed from the vessel and renovated.

It will be seen that by this process the advantages of forcing the sirup up through the charcoal are obtained, and at the same time the charcoal is thoroughly cleansed after use in the usual manner.

I do not confine myself to any special means for putting my process into operation, as, although I prefer to place the charcoal in cylinders hung on trunnions, and of a depth about equal to their diameter, any kind of vessel so mounted that it can be inverted may be used, the only requisite being that both ends of the vessel must be provided with the usual straining medium.

It will also be understood that, although my invention has special reference to the process of sugar-refining, it will be found of great use in all cases where a medium for clarifying any liquid has to be cleansed therefrom by a liquid of less density—such, for instance, as in the case of alcohol following an aqueous solution.

What I claim is as follows:

1. The art or process of clarifying sirup or solution of sugar by forcing it up through a suitable medium contained in a vessel, which, at the desired point of the operation, is inverted, so that the sirup remaining therein filtrates downward, but in the original direction and to the original outlet, all substantially as herein described, and for the purposes set forth.

2. The art or process of clarifying any liquid and cleansing the clarifying medium by a liquid of less density by forcing the liquid to be purified up through the medium, reversing, when desired, the vessel containing same, allowing the remainder of the liquid to filtrate downward, and simultaneously letting in the cleansing-fluid on top, all as herein described, and for the purposes set forth.

Montreal, 1st day of February, A. D. 1882.

GEORGE ALEXANDER DRUMMOND.

Witnesses:
W. DE M. MARLER,
FRAS. HY. REYNOLDS.